Figure 1:
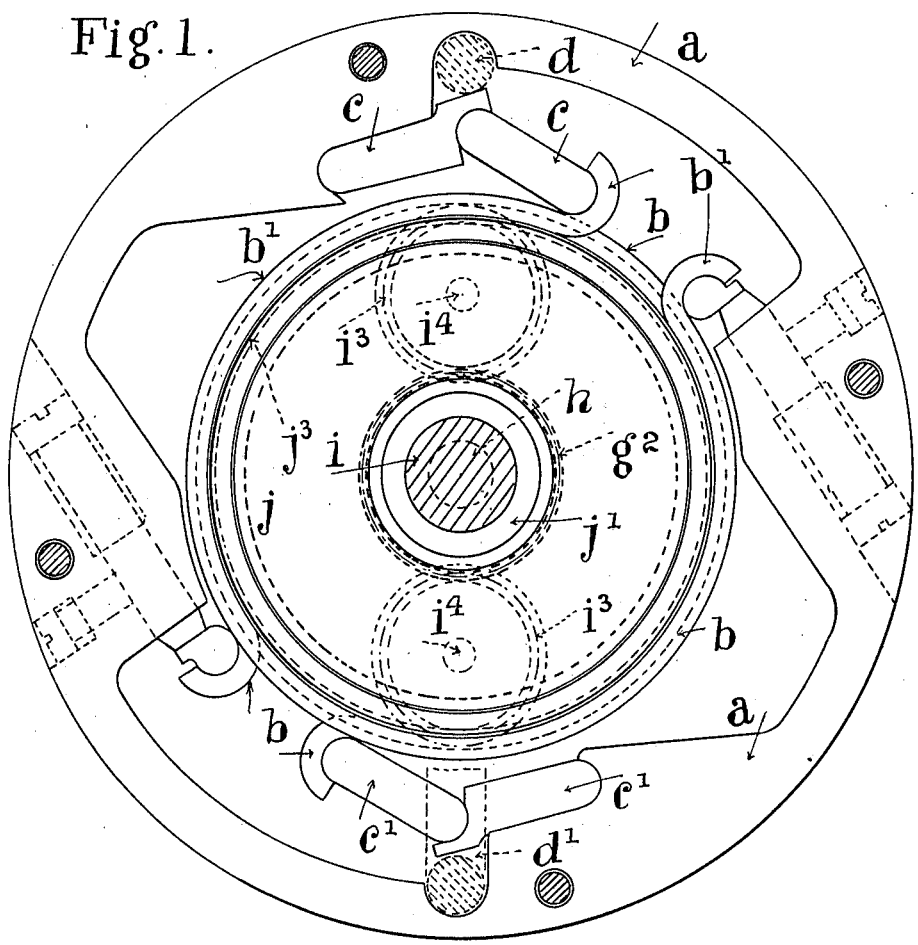

A. J. DRAKE & J. M. HEWITT.
GEARING.
APPLICATION FILED OCT. 28, 1911.

1,041,047.

Patented Oct. 15, 1912.

2 SHEETS—SHEET 1.

WITNESSES.
John C. Sanders
John A. Percival.

INVENTORS.
Arthur James Drake &
James Mitchell Hewitt
By their Attorney

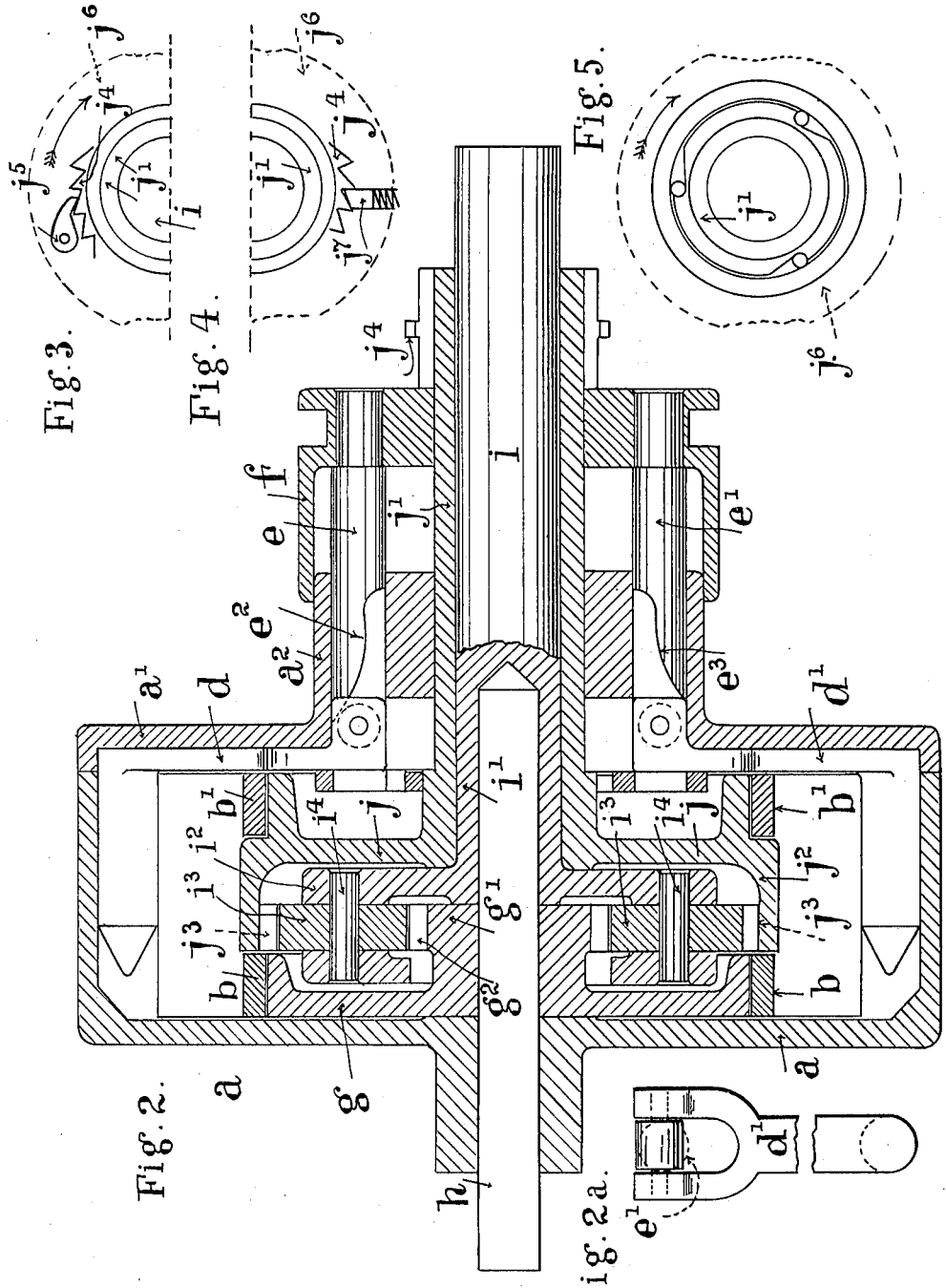

UNITED STATES PATENT OFFICE.

ARTHUR JAMES DRAKE AND JAMES MITCHELL HEWITT, OF MANCHESTER, ENGLAND, ASSIGNORS TO THE SAVER CLUTCH COMPANY LIMITED, OF MANCHESTER, ENGLAND.

GEARING.

1,041,047. Specification of Letters Patent. Patented Oct. 15, 1912.

Application filed October 28, 1911. Serial No. 657,282.

*To all whom it may concern:*

Be it known that we, ARTHUR JAMES DRAKE and JAMES MITCHELL HEWITT, subjects of the King of Great Britain and Ireland, residing, respectively, at 7 Brazemose street, Manchester, in the county of Lancaster, England, and Tower Chambers, Brown street, Manchester, aforesaid, have invented new and useful Improvements in Gearing, of which the following is a specification.

Our said invention has reference to a new driving device or power conveying means in the form of a variable speed gearing.

The attached drawings illustrate the principle involved and show an approved form of the variable speed gearing, and the following description is drafted with particular reference to such drawings which disclose one combination.

In the said drawings, Figure 1 shows a front view of the variable speed gearing device with certain of the parts removed. Fig. 2 is a longitudinal section of the device. Fig. 2$^a$ is a detail view of one drag link and antifriction bowl for plunger. Figs. 3, 4 and 5 indicate ratchet or equivalent mechanism to check backward rotation of the drum and sleeve.

In the construction shown, we utilize an inclosing casing $a$ which houses the flexible bands $b$, $b'$, and toggle levers $c$, $c$, $c'$, $c'$, and we conveniently actuate the sets of toggle levers by drag links $d$ $d'$ acted on by plungers $e$ $e'$ moved by a sliding sleeve $f$.

Inside the casing $a$ is a drum or pulley $g$ loose or free on the driving shaft $h$, and, around this drum or pulley, fits the first flexible band $b$ which the toggles $c$, $c$ contract to effect the driving; or which band $b$ they release as required. On the boss or hub $g'$ of this drum or pulley $g$ teeth $g^2$ are cut. The end of the driven shaft $i$ is formed as a bush $i'$ to surround the extremity of the driving shaft $h$ and also with a face or overhanging disk $i^2$. This face or overhanging disk $i^2$ has pockets or bearings for small spur pinions, as for example two or more, two being shown and marked $i^3$, $i^3$. These spur pinions run on small axles $i^4$, $i^4$, and they gear with the teeth $g^2$ on the boss of the drum or pulley $g$. Surrounding the driven shaft $i$ and its sleeve $i'$, is another drum $j$ with extended sleeve $j'$, and this drum $j$ has a flanged end or overhanging disk $j^2$ which is cut with an internal ring of teeth $j^3$. With this internal ring of teeth $j^3$, the small spur pinions $i^3$ $i^3$ gear. This flanged drum $j$ is also designed to be acted upon by the other flexible band $b'$ and toggle lever combination $c'$ $c'$, and ratchet or other mechanism is provided to prevent backward rotation of the drum $j$ and the sleeve $j'$. For instance, the sleeve $j'$ might be cut with ratchet teeth $j^4$ and a pawl $j^5$ on the stationary bearing $j^6$ may engage therewith, see Fig. 3; or a spring pressed pawl $j^7$ may engage the ratchet teeth, see Fig. 4. As a further variation a ball or roller clutch device may be employed to check backward rotation, and this is indicated at Fig. 5.

Two plungers $e$ $e'$ are used to act on the provided drag links $d$, $d'$, which plungers are arranged to work progressively, that is, the curved or shaped extremity $e^2$ of the plunger $e$ comes into action before the curved extremity $e^3$ of the plunger $e'$, see Fig. 2.

The working operation of the illustrated construction is, as follows. On the advance of the plunger $e$, the curved extremity $e^2$ acts on the drag link $d$ and the first flexible band $b$ binds on the drum or pulley $g$, the teeth $g^2$ drive the spur pinions $i^3$, $i^3$, which gear with the internal teeth $j^3$ on the flanged drum $j$. This flanged drum $j$ with its sleeve $j'$ being unable to rotate backward, due to the ratchet or equivalent mechanism, the driven shaft $i'$ is rotated at half speed or a proportionate speed according to the gears employed. On the advance of the curved extremity $e^3$ of the plunger $e'$ to act on the drag link $d'$, and consequent engagement of the plunger $e'$, the flanged drum or pulley is held and locked, and the clutch parts are bound and all revolve together, thus giving the full speed or speed of the driving shaft $h$ to the driven shaft $i$.

The advantages of the device are obvious and need not be enlarged upon. Such an arrangement embodied in connection with automobiles will double the range of a gear box, or alone will provide for a speed variation suitable for some driving mechanism. We actuate and control the sleeve $f$ carrying the plungers $e$, $e'$ in any approved manner. With the construction indicated, all the mechanism is entirely boxed in, a disk $a'$ with bored boss $a^2$, along with the before mentioned shell $a$, inclose the entire sun and planet gearing and parts.

It is to be understood, the invention herein set forth is susceptible of considerable modification and it is obvious that we may vary the gear wheels and arrange to obtain more than two speeds and that we may employ for this purpose more than two flexible bands and more than two plungers.

The variable speed gearing is particularly suitable for motor vehicles, for launches, and for work shop use where heavy loads require to be picked up without undue straining of the driving gear or coupled machine.

We declare that what we claim is.

1. A variable speed gearing comprising a driving shaft, a clutch casing, a drum therein, provided with a boss and a flexible band surrounding said drum, a gear on the drum boss, a driven shaft, gear wheels carried therefrom, and a second drum having a gear, and a band surrounding said second drum, toggle links operating the flexible bands, and drag links and means for moving the drag links progressively as set forth.

2. Variable speed gearing having a driving shaft, a clutch casing thereon, and a drum loose on said shaft, means to be contracted around the drum and a gear on the drum, a driven shaft constituting a carrier for spur pinions and spur pinions on said carrier, a sleeve and a second drum, an internal gear on said second drum and means capable of being contracted, toggle links, and radially movable drag links and sliding means for acting on the drag links progressively as set forth.

3. Variable speed gearing comprising a driving shaft, an enveloping clutch casing thereon, a drum with external gear, a flexible band, a driven shaft, gear wheels carried thereby, a second drum with internal gear, a flexible band surrounding the drum, and toggle links, and drag links acting on the same, and sliding plungers, a sleeve carrying the same and movable along said sleeve, the sliding plungers acting one in advance of the other, as set forth.

4. A variable speed gearing having, in combination, a driving shaft, a clutch casing, a drum having internal teeth, a flexible band surrounding the drum, a driven shaft, a support for gear wheels, gear wheels on said support, a sleeve and a second drum having internal teeth and a flexible band surrounding the drum, sets of toggle levers and drag links, a movable sleeve, and incased progressively acting plungers carried on said sleeve, said plungers coöperating with the drag links, as set forth.

In testimony whereof we have signed our names to this specification in the presence of two subscribing witnesses.

ARTHUR JAMES DRAKE.
JAMES MITCHELL HEWITT.

Witnesses:
RICHARD WEBSTER IBBERSON,
ALFRED STUART YATES.

---

Copies of this patent may be obtained for five cents each, by addressing the "Commissioner of Patents, Washington, D. C."